United States Patent [19]

Yanagawa

[11] Patent Number: 5,193,083
[45] Date of Patent: Mar. 9, 1993

[54] OPTICAL PICK-UP DEVICE

[75] Inventor: Naoharu Yanagawa, Tokorozawa, Japan

[73] Assignee: Pioneer Electronic Corporation, Tokyo, Japan

[21] Appl. No.: 888,962

[22] Filed: May 26, 1992

[30] Foreign Application Priority Data

May 27, 1991 [JP] Japan .................................. 3-121332

[51] Int. Cl.$^5$ ............................................... G11B 7/85
[52] U.S. Cl. ...................................... 369/116; 369/131
[58] Field of Search ............... 369/116, 118, 110, 131, 369/121, 122; 430/495

[56] References Cited
U.S. PATENT DOCUMENTS 5,042,020  8/1991  Endo .................................. 369/116

*Primary Examiner*—Constantine Hannaher
*Assistant Examiner*—Don Wong
*Attorney, Agent, or Firm*—Kane, Dalsimer, Sullivan, Kurucz, Levy, Eisele and Richard

[57] ABSTRACT

An optical pick-up device comprises a light source, a light beam switching unit, a light intensity change unit and a signal detection unit including photodiodes.

A light beam emitted from the light source and irradiated on an information recording medium has a wavelength for recording information and a wavelength, different from the former, for the reproducing information. The light beam switching unit carries out switching between a light having the wavelength for recording information and a light having the wavelength for reproducing information.

The light intensity change unit transmits or reflects the light beam having the wavelength for recording information with attenuation to prevent a saturation of the photodiodes and transmits or reflects the light beam having the wavelength for reproducing information without attenuation. The light beam thus produced is detected by the signal detecting unit, and the servo control such as focusing servo, etc. is carried out on the basis of the detected signal.

6 Claims, 6 Drawing Sheets

OPTICAL PICK-UP DEVICE

BACKGROUND OF THE INVENTION

This invention relates to an optical pick up device used in an apparatus for optically recording information on or reproducing information from a recordable optical disc.

To record information on the disc or to reproduce recorded information therefrom, an optical pick-up device irradiates, onto a disc, laser beams having appropriate intensity for recording and reproduction. At the time of recording information, a laser beam having a large light intensity, emitted from the optical pick-up device, is irradiated onto the disc to record information on the disc. On the other hand, at the time of reproducing information, a laser beam having a smaller light intensity than that for recording is emitted from the optical pick-up device and irradiated onto the disc to reproduce recorded information, on the basis of a light signal reflected by the disc surface. At the time of reproduction, a laser beam of a maximum light intensity in a range where information cannot be recorded is irradiated onto the disc, so as to keep S/N ratios of control signals of the servo system and an RF signal of the reproducing system to be sufficiently large.

Further, in the case of recordable discs reproduced by a conventional optical pick-up device, the sensitivity becomes higher when the reflectivity is lower. Since a semiconducor laser having a low output power (intensity) is conventionally used, optical discs having a small reflectivity have been used. Accordingly, since such discs are only applicable to the optical pick-up device exclusively used for discs having a small reflectivity, they cannot be reproduced by an apparatus exclusive for reproduction which can only reproduce discs having a large reflectivity.

On the other hand, there have been recently developed a recordable disc having a high reflectivity which is called an R-CD (Recordable Compact disc). At present, since information is recorded at a low linear velocity (1.2 to 1.4 m/sec) in these R-CDs, the recording can be carried out with a recording beam of relatively small power (light intensity). However, if an attempt is made to record information onto the R-CDs at a high linear velocity, in order to improve the transfer rate in future, the recording power should be higher. If the recording power is high, since the R-CDs have a large reflectivity, an excessive reflected light is incident on photodetectors (light receiving element). As a result, the focusing or tracking control servo control becomes unstable because the photodetector element itself becomes saturated.

To solve this problem, it is conceivable to provide a light quantity cut filter on the light incident side of the photodector for interrupting a reflected light having a large intensity, so as to reduce an intensity of the incident light beam by a fixed quantity with respect to the entire band at the time of recording, thus to prevent saturation of the photodetector elements. In this case, however, there was the problem that since a laser beam incident on the photodetector is reduced not only at the time of recording but also at the time of reproduction, the S/N ratio of a reproducing signal becomes small. In addition, since received light quantity of the photodetector at the time of recording differs from that at the time of reproduction, it is required to switch a gain of the servo control system between the time of recording and the time of reproduction.

SUMMARY OF THE INVENTION

This invention has been made in order to solve the above mentioned problems, and its object is to provide an optical pick-up device capable of stabilizing a control of servo system at the time of recording, and improving an S/N ratio of a reproducing signal at the time of reproduction.

According to one aspect of this invention, there is provided an optical pick-up device for irradiating a light beam onto an information recording medium to record information thereon and to reproduce information therefrom comprising a light source for emitting and irradiating the light beam onto the information recording medium, light beam switch means for switching the light beams from said light source between a light beam having a recording wavelength and a light beam having a reproducing wavelength, light intensity change means for receiving a light beam reflected by the information recording medium and producing a transmitted light beam, said light intensity change means transmits or reflects the light having the recording wavelength with a first transmittance/reflectivity and the light beam having the reproducing wavelength with a second transmittance/reflectivity.

The light beam switching means carries out switching between a light having the wavelength for recording information and a light having the wavelength for reproducing information. The light intensity change means transmits or reflects the light beam having the wavelength for recording information with attenuation to prevent a saturation of the photodetectors and transmits or reflects the light beam having the wavelength for reproducing information without attenuation. The light beam thus produced is detected by the signal detecting unit, and the servo control such as focusing servo, etc. is carried out on the basis of the detected signal.

Accordingly, a saturation of the photodetector itself can be prevented at the time of the recording operation. Thus, the control servo system such as focusing control, or tracking control, etc. can be stabilized. Further, an S/N ratio of a reproducing signal at the time of the reproducing operation can be maintained at a high value.

DESCRIPTION OF THE PREFERRED EMBODIMENTS

First embodiment

Figure 1:
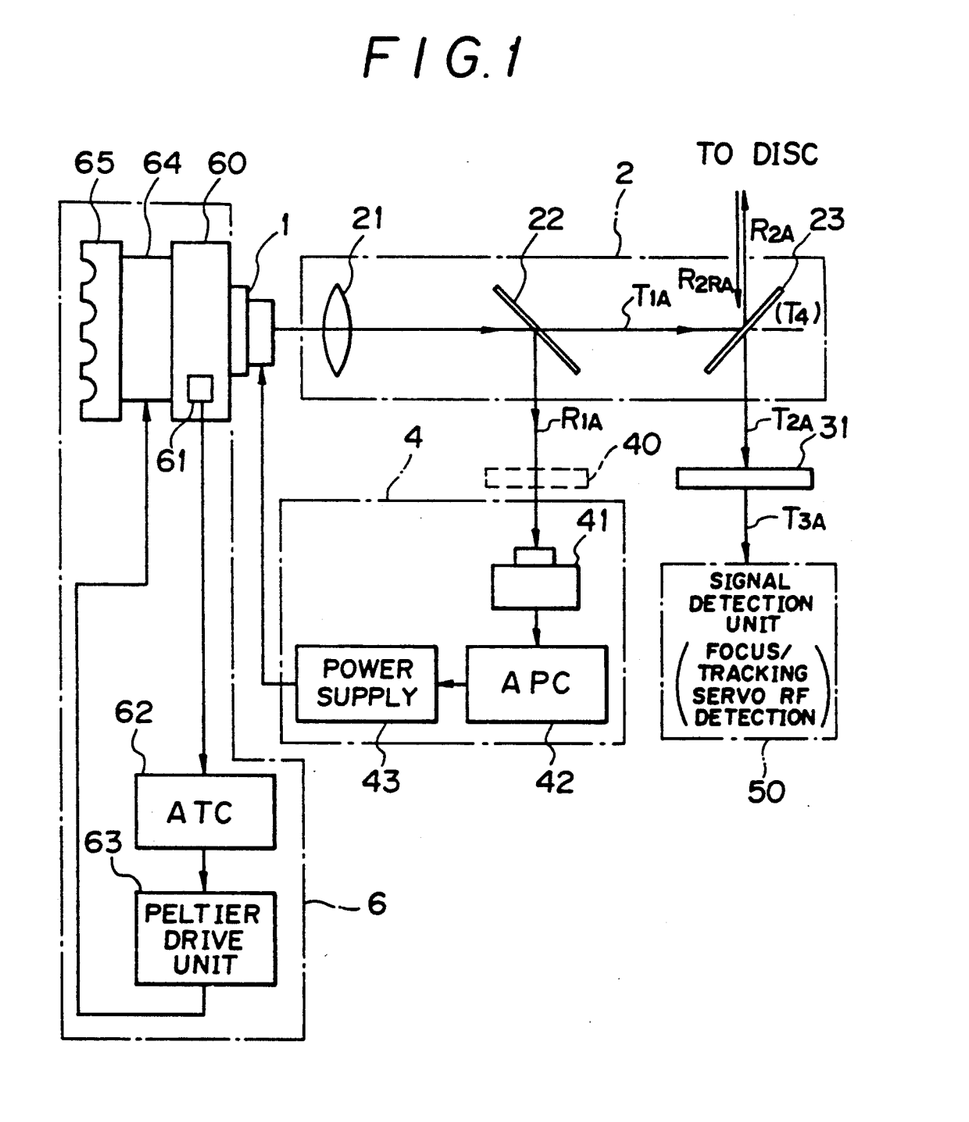
FIG. 1 is a block diagram showing a configuration of an optical pick-up device according to a first embodiment of this invention.

A first embodiment of this invention will now be described with reference to FIGS. 1 and 2. FIG. 1 is a block diagram showing a configuration of an optical pick-up device of this embodiment, and FIG. 2 shows a transmission/reflection characteristic of an optical filter according to this embodiment.

The optical pick-up device according to this embodiment comprises a semiconductor laser 1 for emitting a laser beam for respective recording and reproducing operations, a laser beam dividing unit 2 for dividing the laser beam into a light beam component supplied to a disc (not shown) and light beam components supplied to other portions, an optical filter 31 for transmitting a laser beam transferred from the laser beam dividing unit 2 with two different transmittances (transmission factors) each corresponding to predetermined oscillation wavelengths λ1 and λ2, a laser output control unit 4 for controlling the semiconductor laser 1 so that its output laser power (light intensity) is kept constant, and a temperature control unit 6 for controlling a temperature of the semiconductor laser 1 to be kept constant.

The laser beam dividing unit 2 comprises a collimator lens 21 for producing a parallel light from a laser beam emitted from the semiconductor laser 1, a first dividing filter 22 for reflecting a portion (about several %) of the parallel light to produce a reflected light $R_{1A}$ and for transmitting the other portion thereof to produce a transmitted light $T_{1A}$, and a second dividing filter 23 for transmitting a portion (about several %) of the transmitted light T1 to produce a transmitted light $T_{4A}$ and for reflecting the other portion of the transmitted light $T_{1A}$ to produce a reflected light $R_{2A}$ incident on the disc surface. Further, the second dividing filter 23 transmits a return light $R_{2RA}$ substantially with no attenuation to produce a transmitted light $T_{2A}$.

Figure 2:
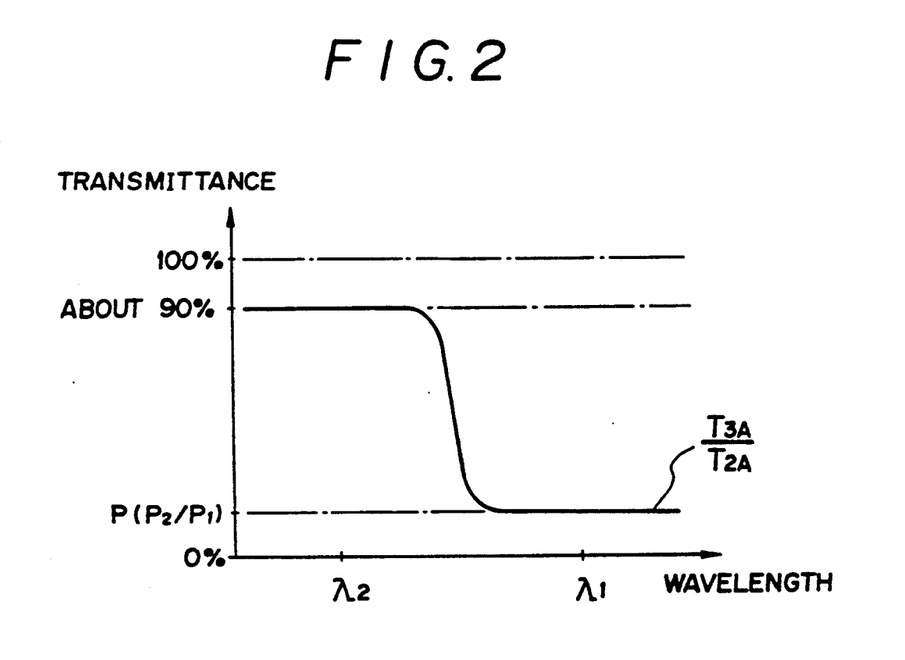
FIG. 2 is a transmission/reflection characteristic diagram of an optical filter shown in FIG. 1.

The transmission/reflection characteristic of the optical filter 31 is shown in FIG. 2. At the time of the recording operation, the oscillation wavelength is α1. In this case, the optical filter 23 transmits the light $T_{2A}$ transferred from the second dividing filter 23 with a transmittance P (=P2/P1). The transmittance P indicates a ratio of an intensity P2 of reproducing laser beam to an intensity P1 of recording laser beam. That is, P2 indicates the laser beam intensity of the semiconductor laser 1 at the time of the reproducing operation while P1 indicates the laser beam intensity of the semiconductor laser 1 at the time of the recording operation. Since laser beam for recording operation is required to have a larger power (higher intensity) than that for reproducing operation, the intensity P1 is higher than the intensity P2. At the time of the reproducing operation, the oscillation wavelength is λ2. In this case, the optical filter 31 transmits the light $T_{2A}$ with a transmittance about 0.9 (90%).

The laser output control unit 4 comprises a photodiode 41 for receiving or detecting a reflected light R1 reflected by the first dividing filter 22 to convert it to a corresponding electric signal, an Automatic Power Control unit (APC) 42 for comparing the electric signal with a recording reference signal or a reproduction reference signal set in advance, so as to output an output control signal to keep the output intensity of the semiconductor laser 1 be a constant value P1 or P2, and a power supply 43 for applying a voltage of a fixed value to the semiconductor laser 1 on the basis of the output control signal.

Further, the temperature control unit 6 comprises a heat sink 60 provided on the back side of the semiconductor laser 1 in a manner closely in contact therewith to transmit an radiated and/or absorbed heat, a temperature sensor 61 provided within the heat sink 60 to detect the temperature thereof to output a detection signal, an Automatic Temperature Control unit (ATC) 62 to output a temperature control signal for controlling the temperature of the semiconductor laser 1 to be a predetermined value, of the basis of the detection signal, a Peltier drive unit 63 for outputting a predetermined current on the basis of the temperature control signal, a Peltier element 64 for carrying out a heat radiation/absorption on the basis of a value of a current output from the Peltier drive unit 63, and a radiation unit 65 for radiating the heat absorbed from the heat sink 60 through the Peltier element 64.

The operation of the optical pickup apparatus according to this embodiment will now be described.

Explanation will proceed on the premise that the semiconductor laser 1 is controlled by the temperature control unit 6 so that its temperature takes a fixed value. First, at the time of the recording operation for recording information onto the disc, the APC 42 in the laser output control unit 4 supplies an output control signal to the power supply 43, on the basis of a recording reference signal, to apply a voltage of a predetermined value to the semiconductor laser 1. The semiconductor laser 1 oscillates and emits a recording laser beam (oscillation wavelength=λ1) of an intensity P1 which is required for the recording operation. The recording laser beam is changed to a parallel light beam by the collimator lens 21 to be incident on the first dividing filter 22. Most of the parallel light beam thus produced is transmitted to be a transmitted light $T_{1A}$ while a portion (about several %) thereof is reflected to be a reflected light $R_{1A}$. The transmitted light $T_{1A}$ is further reflected to the disc direction as a reflected light $R_{2A}$ by the second dividing filter 23 while the several % of the remainder is transmitted as a transmitted light $T_{4A}$. The reflected light $R_{2A}$ irradiated on the disc is reflected by the disc surface. The reflected light thus obtained is incident on the second dividing filter 23 for a second time as a return light $R_{2RA}$, and is then transmitted to the optical filter 31 as a transmitted light $T_{2A}$.

Since the oscillation wavelength of the recording laser beam is λ1, the optical filter 31 transmits the light $T_{2A}$ with transmittance P (=P2/P1) indicating a ratio of the reproducing laser beam intensity P2 to the recording laser beam intensity P1, to output the transmitted light $T_{3A}$ to the signal detection unit 50. The signal detection unit 50 detects the light beam $T_{3A}$ whose intensity is attenuated with a ratio of P (=P2/P1) by respective photodiodes (not shown) and performs focusing servo and tracking servo controls on the basis of a detected signal. In this case, a recording laser beam having a light intensity P1 sufficient to record information is irradiated on the disc. In addition, since the respective photodiodes for focusing servo and tracking servo detect the transmitted light $T_{3A}$ whose intensity is resultingly attenuated to be equal to the intensity P2, appropriate photoelectric signals are obtained without any possibility of saturation of the photodiodes. Thus, stable focusing servo operation and tracking servo operation can be carried out in the signal detection unit 50.

On the other hand, at the time of the reproducing operation, a predetermined voltage output from the power supply 43, based on a reproducing reference signal of the APC 42, is applied to the semiconductor laser 1 so that an output laser power therefrom is kept to be a fixed value. Therefore, the semiconductor laser 1 oscillates and emits a reproducing laser beam (oscillation wavelength=$\lambda 2$) of an intensity P2 which is required for the reproducing operation. This laser beam $R_{2A}$ is reflected to the disc direction by the laser beam dividing unit 2 in the same manner as the case of the recording operation. As a result, a return light $R_{2RA}$ reflected by the disc surface is incident on the optical filter 31 as a transmitted light $T_{2A}$ through the second dividing filter 23.

Since the oscillation wavelength of the reproducing laser beam is $\lambda 2$, the optical filter 31 transmits, to the signal detection unit 50, a transmitted light $T_{3A}$ with a transmittance of about 90% as shown in FIG. 2. The signal detection unit 50 executes respective operations of focusing servo and tracking servo in the same manner as in the recording operation on the basis of the transmitted light $T_{3A}$, and carries out detection of an RF signal. As stated above, at the time of the reproducing operation, the optical filter 31 transmits the return light $R_{2RA}$ from the disc with a transmittance of about 90%, which is greater than the transmittance P at the time of the recording operation, to output the transmitted light $T_{3A}$ to the signal detection unit 50. That is, the laser beam having an intensity approximately equal to the reproducing light intensity P2 is input to the signal detection unit 50. Thus, a reproducing signal having a sufficiently large S/N ratio can be produced.

Second embodiment

Figure 3:
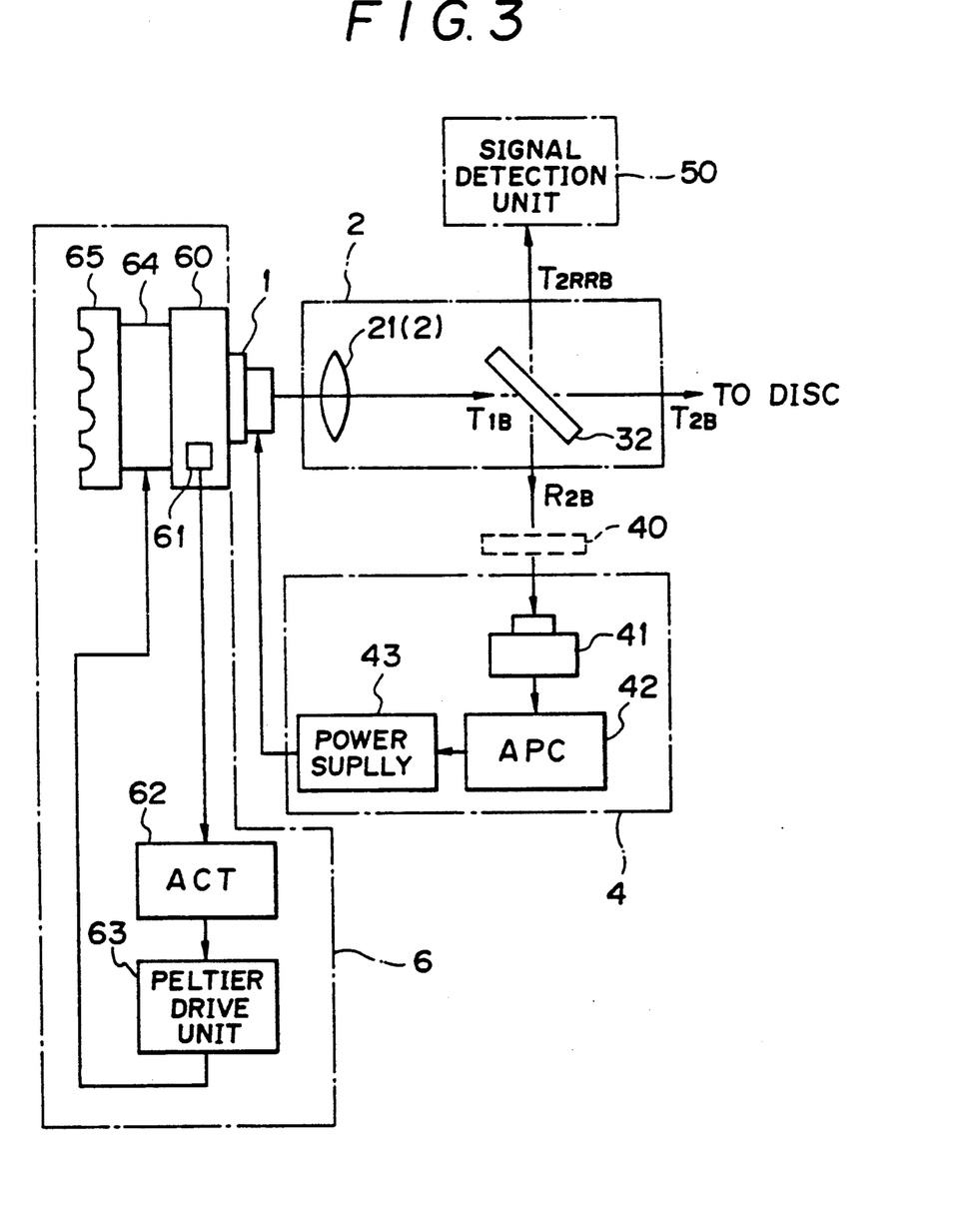
FIG. 3 is a block diagram showing a configuration of an optical pick-up device according to a second embodiment of this invention.

A second embodiment of this invention will now be described with reference to FIGS. 3, 4(A) and 4(B). FIG. 3 is a block diagram showing a configuration of an optical pick-up device of this embodiment, FIG. 4(A) shows a detailed function of the optical filter and FIG. 4(B) shows a diagram of a transmission/reflection characteristic of the optical filter.

The optical pick-up device according to this embodiment comprises, in common with the first embodiment shown in FIG. 1, semiconductor laser 1, laser output control unit 4, temperature control unit 6, and signal detection unit 50. However, the configuration of the laser beam dividing unit 2 differs from that of the first embodiment. The laser beam dividing unit 2 is comprised of a collimator lens 21 for changing a laser beam emitted from the semiconductor laser 1 to a parallel light beam, and an optical filter 32.

Figure 4A:
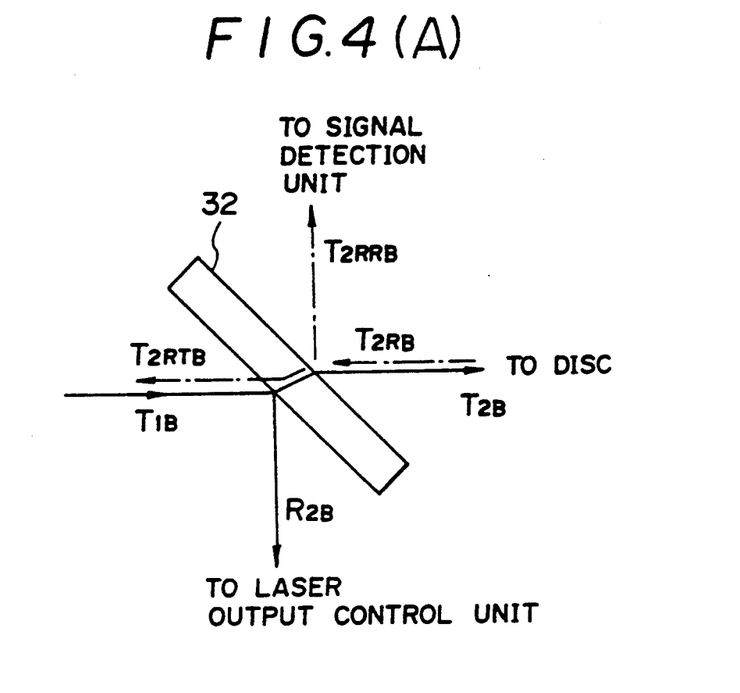
FIG. 4(A) is a diagram showing a detailed function of the optical filter.
Figure 4B:
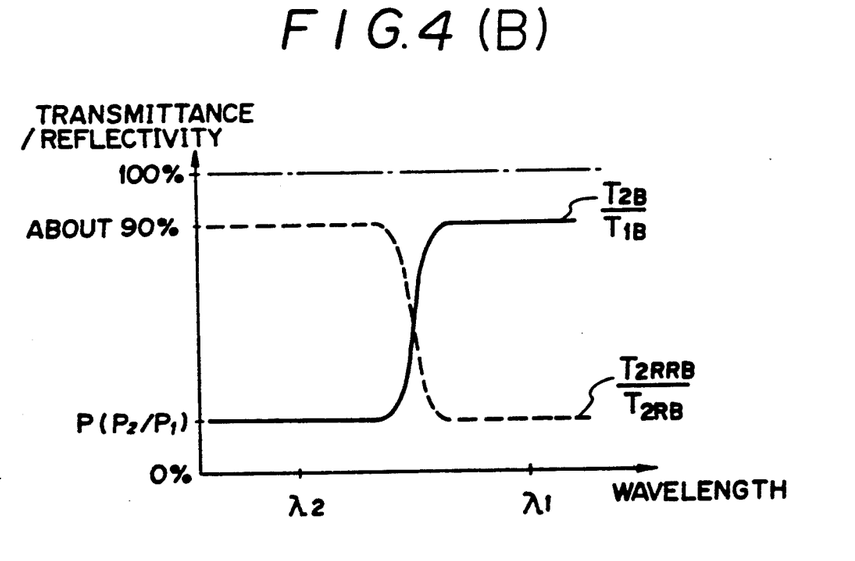
FIG. 4(B) is a transmission/reflection characteristic diagram of the optical filter shown in FIG. 4(A).

The optical filter 32 has a function as shown in FIGS. 4 (A) and (B). At the time of the recording operation, since the laser beam $T_{1B}$ has a wavelength $\lambda 1$, the optical filter 32 transmits the light $T_{1B}$ with a transmittance of about 90%. A return light beam $T_{2RB}$ has a wavelength $\lambda 1$, the intensity of return light beam $T_{2RB}$ is reflected by the optical filter 32 to be a reflected light beam $T_{2RRB}$. In this case, since the the light beam $T_{2RRB}$ is attenuated with a ratio of P (=P2/P1). Accordingly, the attenuated light beam $T_{2RRB}$ is input to the signal detection means.

At the time of the reproducing operation, since the laser light $T_{1B}$ has a wavelength $\lambda 2$, the optical filter 32 transmits the light $T_{1B}$ with a transmittance P. In this case, since the return light beam $T_{2RB}$ has a wavelength $\lambda 2$, the intensity of the light beam $T_{2RRB}$ has a ratio of 0.9 (90%) to the light beam $T_{2RB}$.

As stated above, the transmittance/reflectivity of the optical filter 32 is different corresponding to the different wavelengths at the time of the recording operation and the reproducing operation. Therefore, at the time of the recording operation, respective photodiodes for focusing servo and tracking servo output sufficient electric signals without being saturated, thus making it possible to carry out stable focusing servo operation and tracking servo operation. In addition, the optical filter 32 can detect a reproducing signal of a sufficiently large S/N ratio at the time of the reproducing operation.

Third embodiment

Figure 5:
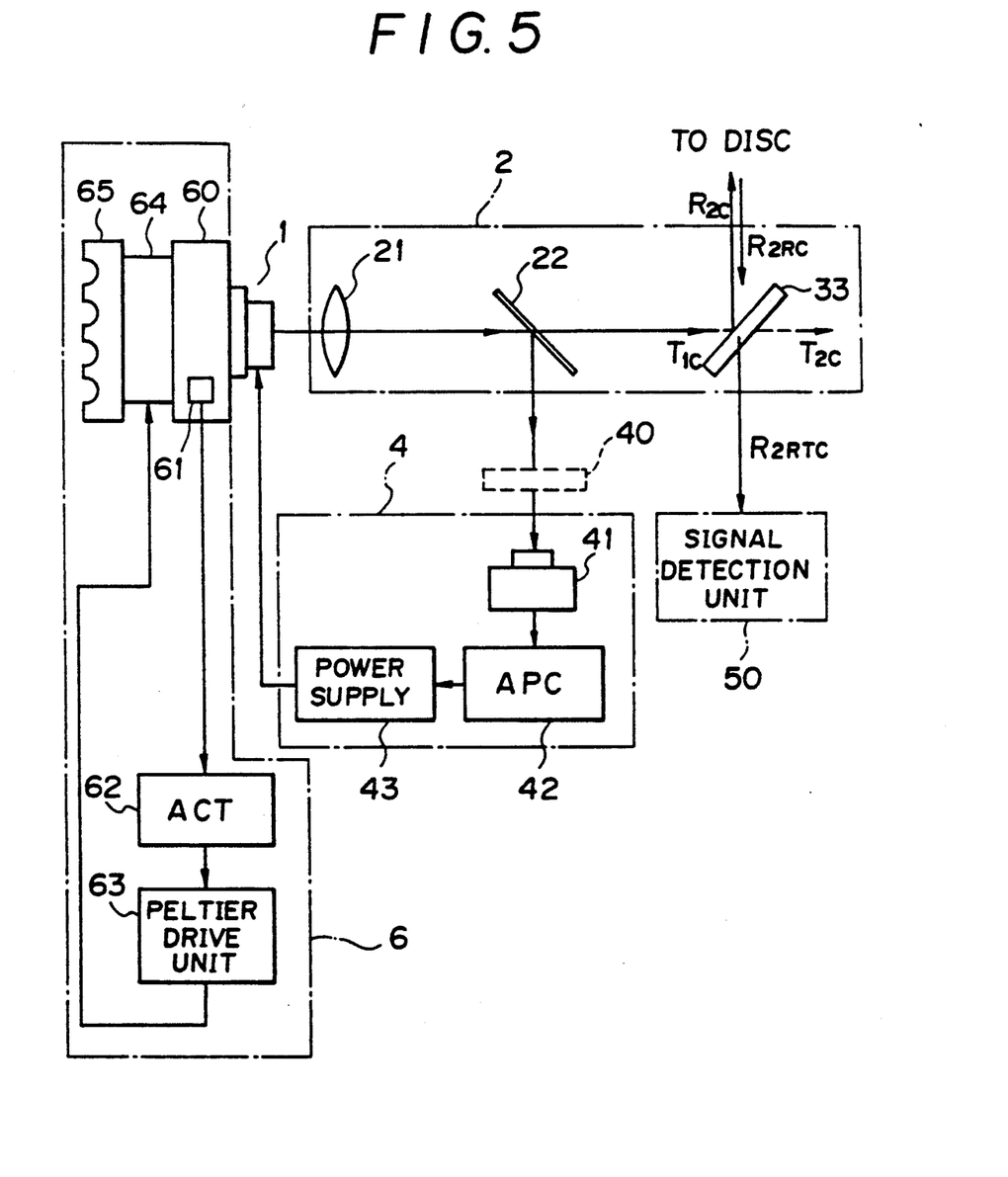
FIG. 5 is a block diagram showing a configuration of an optical pick-up device according to a third embodiment of this invention.
Figure 6A:
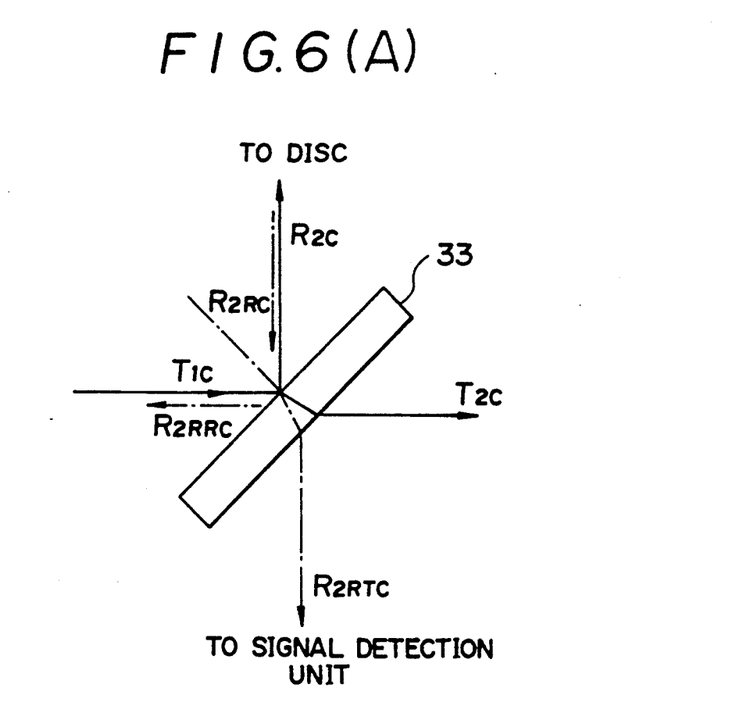
FIG. 6(A) is a diagram showing a detailed function of the optical filter.

A third embodiment of this invention will now be described with reference to FIGS. 5, 6(A) and 6(B). FIG. 5 is a block diagram showing a configuration of an optical pick-up device of this embodiment. FIG. 6(A) shows a detailed function of the optical filter and FIG. 6(B) shows a transmission/reflection characteristic of the optical filter 33.

In the respective figures, the optical pick-up device according to third embodiment comprises, in common with the embodiment shown in FIG. 1, semiconductor laser 1, laser beam output control unit 4, temperature control unit 6, and signal detection unit 50. However, the configurations of the laser beam dividing unit 2 and the optical filter 33 differ from the first embodiment.

The laser beam dividing unit 2 comprises a collimator lens 21 for changing a laser beam emitted from the semiconductor laser 1 to a parallel light beam, a first dividing filter 22 for reflecting a portion (about several %) of the parallel light beam to be incident on the control unit 4 and transmitting the other portion thereof to produce the transmitted light $T_{1C}$, and an optical filter 33.

Figure 6B:
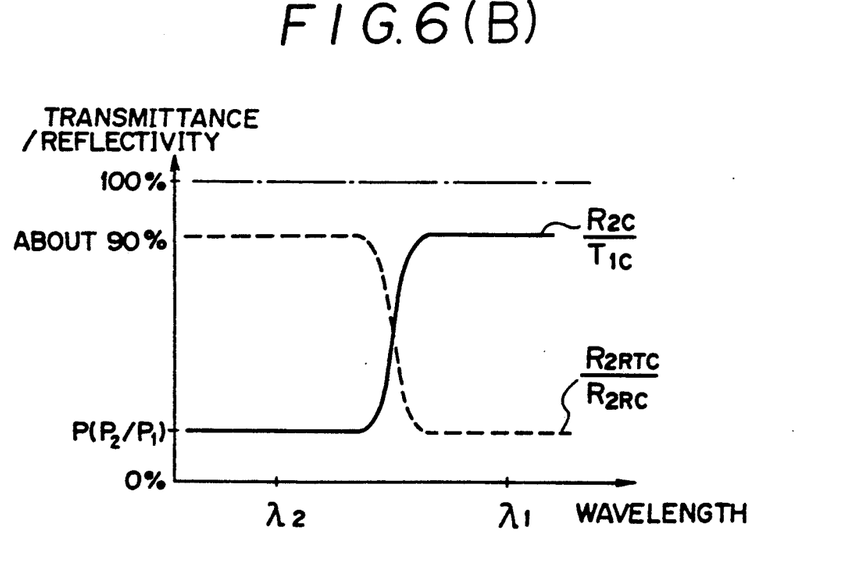
FIG. 6(B) is a transmission/reflection characteristic diagram of the optical filter shown in FIG. 6(A).

The optical filter 33 has a function as shown in FIGS. 6 (A) and (B). At the time of the recording operation, since the laser beam $T_{1C}$ has a wavelength $\lambda 1$, the optical filter 33 reflects the light beam $T_{1C}$ with a reflectivity of 0.9 beam $R_{2RC}$ also has a wavelength $\lambda 1$, the optical filter (90%) to produce a light beam $R_{2C}$. The light beam $R_{2C}$ is reflected by the disc surface to be a light beam $R_{2RC}$. Since the light beam $R_{2RC}$ also has wavelength $\lambda 1$, the optical filter 33 transmits the light $R_{2RC}$ with a transmittance P to produce a light beam $R_{2RTC}$.

At the time of the reproducing operation, since the laser beam $R_{2C}$ has a wavelength $\lambda 2$, the optical filter 33 reflects the light beam $T_{1C}$ with a reflectivity of P to produce a light beam $R_{2C}$. The light beam $R_{2C}$ is reflected by the disc surface to be a light beam $R_{2RC}$. Since the light beam $R_{2RC}$ also has a wavelength $\lambda 1$, the optical filter 33 transmits the light $R_{2C}$ with a transmittance of 0.9 (90%).

As stated above, the transmittance/reflectivity of the optical filter is different corresponding to the different wavelengths at the time of the recording operation and at the time of the reproducing operation. Therefore, at the time of the recording operation, respective photodiodes for focusing servo and tracking servo of the signal detection unit 50 can output sufficient electric signals without being saturated. Thus, stable focusing servo operation and tracking servo operation can be carried out. In addition, the optical filter 33 can detect a reproducing signal of a sufficiently large S/N ratio at the time of the reproducing operation.

Other embodiments

In the above described respective embodiments, when the oscillation wavelength of the laser beam is λ1, the transmittance/reflectivity of the optical filter 31 (or 32, 33) is decided to take a value corresponding to a ratio of reproducing laser beam intensity to recording laser beam intensity. However, this invention is not limited to such a structure. Namely, the transmittance/reflectivity may be decided to take an arbitrary value in a range where the photodiodes for focusing servo and tracking servo are not saturated at the time of the recording operation.

Further, in the above described embodiments, the divided laser beam $R_{1A}$ or $R_{2A}$ may be supplied to the laser output control unit 4 from the succeeding stage of the optical filter 31 such as the signal detection unit 50, etc.

In addition, in the above described embodiments, while a laser beam from the laser beam dividing unit 2 is directly input to the laser output control unit 4, the laser beam may be input through a filter 40 having the same characteristic as the optical filter 31 (or 32, 33). In this case, it is to be noted that the temperature control of the semiconductor laser should be carried out prior to the APC operation.

What is claimed is:

1. An optical pick-up device for irradiating a light beam onto an information recording medium to record information thereon and reproduce information therefrom, comprising:
    a light source for emitting and irradiating the light beam onto the information recording medium;
    light beam switch means for switching the light beams emitted from said light source between a light beam having a recording wavelength and a light beam having a reproducing wavelength; and
    light intensity change means for receiving a light beam reflected by the information recording medium and producing a transmitted light beam, said light intensity change means changing an intensity of the light beam having the recording wavelength with a first change ratio and an intensity of the light beam having the reproducing wavelength with a second change ratio.

2. An optical pick-up device according to claim 1, further comprising signal detection means for receiving said transmitted light beam.

3. An optical pick-up device according to claim 1, wherein said first change ratio equals to a ratio of a reproducing laser beam intensity of the light source to a recording laser beam intensity of the light source, and said second change ratio substantially equals to 1.

4. An optical pick-up device according to claim 2, wherein said signal detecting means comprises photodiodes, said first change ratio is such a value that an intensity of the transmitted light beam is not more than an intensity value which makes the photodiodes saturated, and said second change ratio is approximately equal to 1.

5. An optical pick-up device according to claim 1, wherein said light source comprises a semiconductor laser and a Peltier element provided in contact with the semiconductor laser, and a temperature of the semiconductor laser is kept constant by heat emission and absorption of said Peltier element.

6. An optical pick-up device according to claim 2, wherein said signal detecting means produces an RF signal and control signals for servo controls.

* * * * *